United States Patent [19]

Templin et al.

[11] 4,375,651
[45] Mar. 1, 1983

[54] SELECTIVE VIDEO RECEPTION CONTROL SYSTEM

[75] Inventors: Frank C. Templin, Arlington Heights; Thomas J. Zato, Palatine, both of Ill.

[73] Assignee: Zenith Radio Corporation, Glenview, Ill.

[21] Appl. No.: 287,410

[22] Filed: Jul. 27, 1981

[51] Int. Cl.³ ............................................. H04N 5/44
[52] U.S. Cl. ............................. 358/191.1; 358/194.1; 358/199.1; 358/86
[58] Field of Search ............... 358/191.1, 192.1, 194.1, 358/195.1, 86, 84

[56] References Cited

U.S. PATENT DOCUMENTS

| | | |
|---|---|---|
| 3,859,457 | 1/1975 | Kirk, Jr. |
| 3,968,327 | 7/1976 | Gregg |
| 4,057,829 | 11/1977 | Moorehead |
| 4,279,035 | 7/1981 | Skerlos ............... 358/192.1 |
| 4,280,140 | 7/1981 | Skerlos ............... 358/195.1 |
| 4,302,778 | 11/1981 | Tanaka ............... 358/195.1 |
| 4,305,157 | 12/1981 | Mogi ............... 358/195.1 |

OTHER PUBLICATIONS

"MN 1400 Series: 4-Bit One Chip Microcomputer" Published by Matsushita Electronics Corporation.

*Primary Examiner*—Michael A. Masinick

[57] ABSTRACT

A system for controlling a channel/band selective microcomputer programmed indirect frequency synthesis tuner is disclosed. Separate groups of VHF, UHF or CATV channels are programmed by means of a key switch having various positions of engagement corresponding to individual groups of channels. Following key switch selection of a given group of channels, any number of channels within that group may be programmed for viewing by means of channel UP and DOWN selector keys. A RAM is used to store "saved" and "skipped" channels for each key switch position. A backup non-volatile MNOS memory is provided for preserving stored data in the event AC power is removed. Also provided is programmable raster blanking for audio-only channels thus eliminating unwanted video snow. Front panel LED indicators inform the programmer of the status of each channel during television receiver programming. The television receiver is turned on by viewer selection of either the channel UP or DOWN control resulting in tuning to either the lowest or highest "saved" channel. The OFF function is activated anytime an attempt is made to advance past either the highest or lowest programmed channel by providing either a channel UP or DOWN command, respectively. Thus, television receiver control is by means of a single user selector. A wired remote controller with a speaker is also provided.

15 Claims, 3 Drawing Figures

SELECTIVE VIDEO RECEPTION CONTROL SYSTEM

CROSS-REFERENCE TO RELATED APPLICATION

The present invention is related to co-pending U.S. patent application Ser. No. 107,732, entitled "Microcomputer Controlled One Step Back Automatic Frequency Control Tuning System", filed Feb. 19, 1980, now U.S. Pat. No. 4,280,140, in the name of Peter C. Skerlos, and assigned to the assignee of the present application and which is expressly incorporated herein by reference.

BACKGROUND OF THE INVENTION

This invention generally relates to television receiver tuning control systems and more particularly is directed to a control system for a channel/frequency band programmable television receiver tuner.

The increasing amount of pay television, subscription television (STV), cable television (CATV) and master antenna television (MATV) independent programming available for viewing has given rise to various attempts to limit viewer accessibility to these programs. For example, since an increasing number of television programs are available on a "pay-as-you-view" basis, the distribution of these programs necessarily involves an attempt to limit the availability of these signals to only paying customers. Such video signal distribution systems proposed in the past have typically employed such devices as signal scramblers and unscramblers, or systems controlled by coins, charge cards, tokens or similar articles to provide a special television programming capability. The latter systems generally involve program signals moving in one direction from the received signal input end to the remotely-located television receivers and control and monitoring information traveling in the opposite direction. The former systems generally require somewhat sophisticated signal processing devices while the latter systems necessitate the use of monitoring and control procedures and devices.

One example of a signal scrambling approach to limiting television signal distribution is disclosed in U.S. Pat. No. 4,057,827 to Morehead which makes use of a signal processing device at each remotely-located television receiver. Each signal processor includes a converter for converting the received signal from the standard channel to a locally unassigned VHF channel or one of the unused UHF channels. In addition to a signal converter, each control box also includes a digital encoder and timer, an RF transmitter, a channel program selector switch, and a coupler for feeding the RF transmitter signal output back through the television cable distribution system. Information containing the room number, channel being watched, and/or information is digital code modulated on an RF carrier and transmitted to the central processor receiver, demodulated, fed to the central processor, verified and stored for future use, including billing printout. While offering a highly automated signal distribution and monitoring system, this approach involves an additional, relatively expensive component in each room where the received television signal is to be viewed.

Another approach to selective television signal distribution is disclosed in U.S. Pat. No. 3,859,457 to Kirk wherein is described a selective video suppression apparatus including a band eliminating, notch filter nominally tuned to the channel viewing frequency spectrum. The attenuation of this filter is modulated at a rate faster than the automatic gain control (AGC) response of the television receiver with the result that the varying amplitude incoming signal supplied to the essentially fixed gain television receiver inhibits the receiver from displaying the incoming video signal due to a lack of vertical synchronization, lost color sub-carrier recovery and great amplitude intensity differences. Another approach involving the use of a band suppression filter is taught in U.S. Pat. No. 3,968,327 to Gregg wherein each television receiver has one or more band suppression filters barring reception of a corresponding channel signal. A control signal from a central control station is detected at the receiver and disables the filter at a selected receiver so that the program can be viewed. Both of the aforementioned approaches suffer from a limitation inherent in the use of any signal filtering scheme, i.e., signal losses and a general degradation of the received video signal.

The present invention is intended to avoid the aforementioned limitations by providing a selective video reception control system which is completely compatible with existing television signal distribution systems, is inexpensively incorporated in each individual television receiver and is particularly adapted for use in a hospital or hotel setting where it is desired to program each television receiver to receive only a limited number of frequency bands and only selected channels in each band.

OBJECTS OF THE INVENTION

Accordingly, it is an object of the present invention to provide an improved programmable television receiver tuner control system.

It is another object of the present invention to provide a microcomputer controlled tuner control system for programming a television receiver to receive only designated frequency bands and only selected channels within those bands.

Still another object of the present invention is to provide a user controlled, pre-programmable channel selector offering limited channel and tuning band access in a television receiver.

A further object of the present invention is to provide a programmable, limited channel access television tuning system including a wired remote controller and speaker system, especially adapted for institutional use, such as in a hospital.

A still further object of the present invention is to provide an improved means for the selective suppression of the presentation of designated channels in predetermined frequency bands.

A further object of the present invention is to provide a programmable television tuner control system for the selective video blanking of audio-only channels for the elimination of unwanted video snow therefrom.

Still another object of the present invention is to provide a system for selectively limiting the distribution of video signals to a television receiver which may be utilized with a conventional pay television, STV, CATV or MATV system without requiring modification thereto.

A still further object of the present invention is to provide a system for selective video reception inhibiting which is easily manufactured and readily implemented on a per-subscriber basis.

BRIEF DESCRIPTION OF THE DRAWINGS

The appended claims set forth those novel features believed characteristic of the invention. However, the invention itself as well as further objects and advantages thereof will best be understood by reference to the following detailed description of a preferred embodiment taken in conjunction with the accompanying drawings, where like reference characters identify like elements throughout the various figures, in which:

DESCRIPTION OF THE PREFERRED EMBODIMENTS

Figure 1:
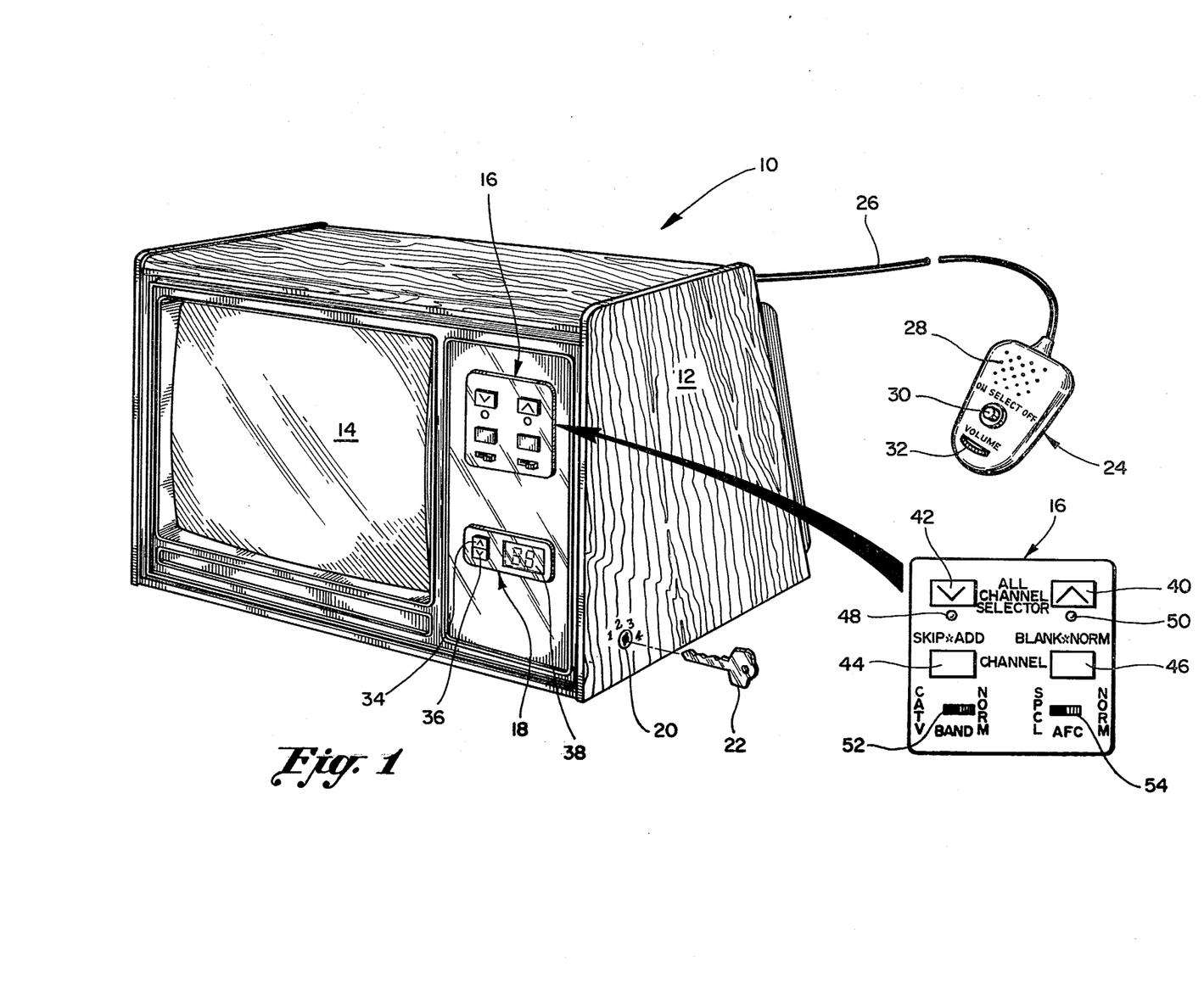
FIG. 1 is a diagrammatic illustration of a selective video reception control system in accordance with the present invention.

Referring to FIG. 1, there is shown a selective video reception control system 10 in accordance with the present invention. A television receiver 12 with video display 14 is provided with a programming panel 16 and a selector panel 18. Programming panel 16 provides for the selective reception of designated television channels in various frequency bands while selector panel 18 enables the television viewer to selectively view a programmed television channel. Channel group selector 20 is operated by means of key 22 and limits viewing to only channels in a designated group, such as in a particular frequency band. Coupled to television receiver 12 by means of a remote control lead 26 is remote controller 24 which includes a rotary volume control 32, an ON/OFF-channel UP control 30, and a remote speaker 28.

Programming panel 16 includes a channel UP programming control 40 for sequencing the television receiver's tuner (not shown) through all channels is an upward direction while channel DOWN programming control 42 permits the television receiver's tuner to sequence in a downward direction through all channels. Depression of the channel access/skip control 44 during the channel UP or DOWN sequence will alternately record the tuned channel in a RAM memory, to be described presently, as a "skipped" or as a "saved" channel for the current position of channel group selector 20. Channel status indicator 48, which preferably is a light emitting diode (LED), is illuminated to inform the user that the current programmed channel is in the "skipped" state. Selection of channel blank/normal control 46 alternately records the tuned channel in the RAM as a "blanked" or an "unblanked" video channel for all positions of frequency band selector 20. RF/CATV selector 52 permits the tuning to VHF and UHF broadcast signals in the NORM position while allowing for tuning to CATV channels in the CATV position. The selective channel group programming provided for by channel group selector 20 is available only when RF/CATV selector 52 is in the CATV position thus making various groups of CATV channels available in accordance with the programming of the television receiver. AFC selector 54 provides for phase lock loop (PLL) tuner operation in tuning in channels on their allocated frequency. When this switch is in the "SPCL", or special, position a special automatic frequency control (AFC) routine is activated in the microcomputer-controlled tuner to enable the television receiver to tune to channels which are off-set up to 2 MHz from their allocated frequency.

The selection of channel UP selector 34 with television receiver 12 off causes the television receiver to turn on and tune to the lowest "saved" television channel. Selection of channel DOWN selector 36 with the set off causes the television receiver 12 to turn on to the highest "saved" channel. The television receiver is turned off by the selection of channel UP or DOWN programming controls 40, 42 so as to exceed the highest or lowest "saved" channel, respectively. Channel UP and DOWN selectors 34, 36 on selector panel 18 permit the sequential up or down tuning to all "saved" channels. In addition, selector panel 18 includes a two-digit channel number display 38 which indicates the channel number selected. The detailed operation of the selective video reception control system 10 of the present invention will now be described.

Figure 2:
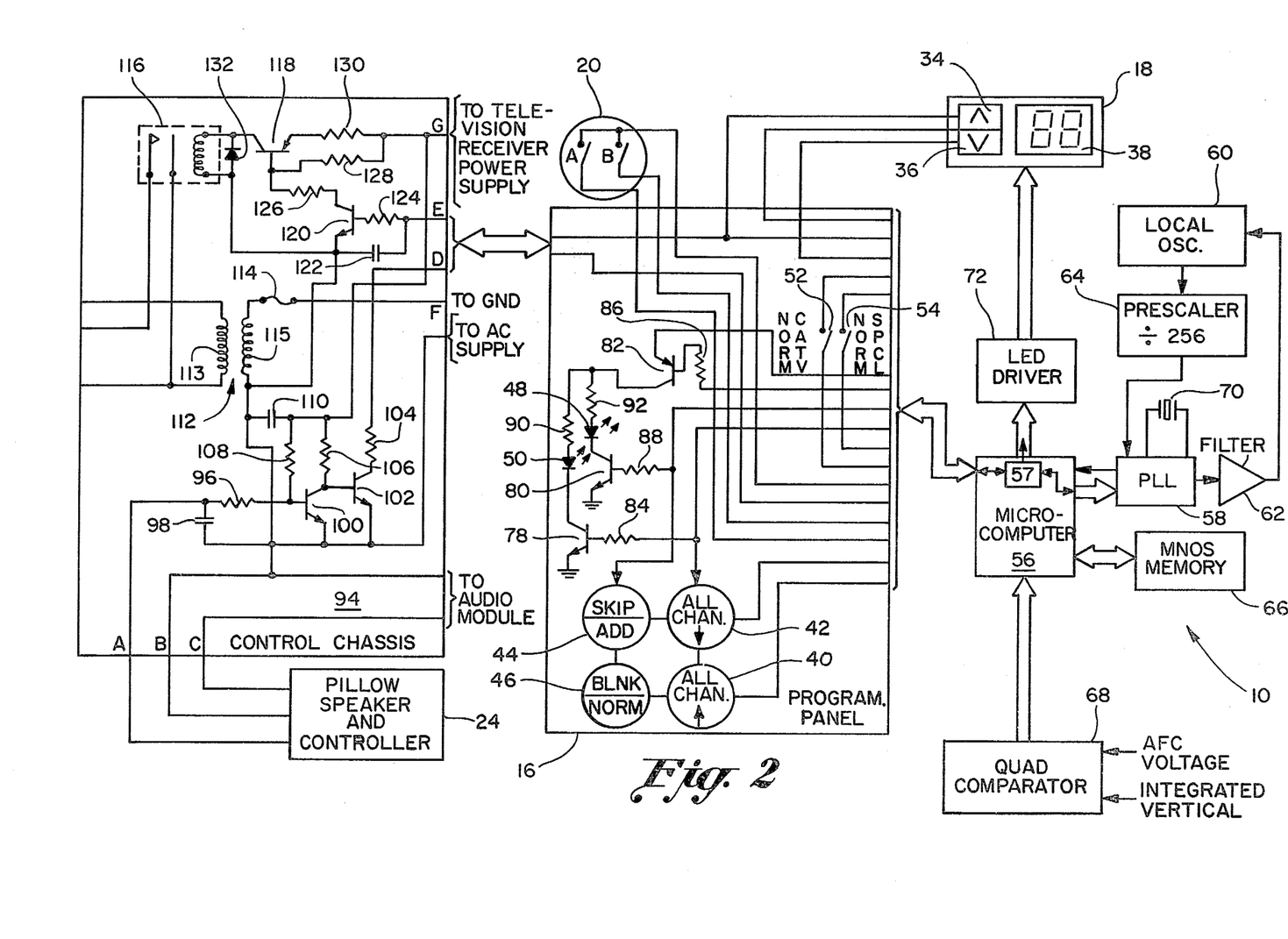
FIG. 2 shows the selective video reception control system of the present invention partially in block diagram and partially in schematic diagram form.

Referring to FIG. 2, there is shown partially in block diagram form and partially in schematic diagram form a selective video reception control system 10 in accordance with the present invention. Automatic frequency synthesis is initiated by means of the actuation of either remote selector 30 on remote controller 24 which applies the line voltage to the television receiver and initiates the tuning to the lowest programmed channel or by the actuation of either channel UP selector 34 or channel DOWN selector 36 which initiates the tuning of television receiver 12 to either the lowest or highest programmed channel. Control signals are provided from channel UP and DOWN selectors 34, 36 via programming panel 16 to microcomputer 56 for sequentially accessing information storage locations in a RAM 57 therein.

Microcomputer 56 is a four bit E/D MOS integrated circuit with a ROM, a RAM 57, an arithmetic logic unit, input/output (I/O) portss and a clock generator on a single semiconductor chip. Microcomputer 56 stores data, periodically updates this stored data, compares both stored and real time data and makes decisions based upon these comparisons in providing system control. The microcomputer chip is the MN 1405 integrated circuit as manufactured by the Matsushita Electronics Corporation, which has been specifically modified for the present application.

Indirect frequency synthesis is utilized in the selective video reception control system 10 in which a phase lock loop (PLL) 58 utilizes the tuner local oscillator (LO) 60 as its voltage controlled oscillator (VCO). In the PLL 58, a reference crystal oscillator 70 frequency of 3.581055 MHz is divided down to a 976.5626 Hz signal which is provided to a phase comparator in PLL 58. The other input to PLL 58 is provided by the tuner local oscillator 60. The frequency division chain from the tuner local oscillator 60 to PLL 58 includes a fixed divided by 256 prescaler 64 and additional frequency dividers (not shown) in PLL 58.

When the divided down reference crystal oscillator 70 signal and the divided down local oscillator signal in PLL 58 are exactly equal, the PLL output is zero. When there is any difference in these two frequencies, an output is provided by PLL 58 to PLL filter 62 which provides a correction voltage to the tuner local oscillator 60 to effect a change in the local oscillator frequency until the two signals have exactly the same frequency. The tuner local oscillator 60 then assumes the stability of the crystal reference oscillator 70. This frequency comparison is done continually in order to compensate for tuner oscillator drift. Since the oscillator frequencies are different for each channel, a different divide ratio must be used for each selected channel. The operation is performed by providing appropriate programmed information from microcomputer 56 to the various divider circuits in PLL 58.

The output of PLL 58 is a series of pulses, the duty cycle of which is dependent on the difference between the reference frequency (1 KHz) and the divided down local oscillator frequency. These pulses are filtered by the active PLL filter 62 resulting in a DC voltage with a negligible amount of 1 KHz ripple. No input pulse results in a high DC voltage and high duty cycle pulses result in a low DC voltage. Once the nominal tuning voltage is established, the tuner circuit 65 acts like a sample and hold circuit and current is either added or subtracted from PLL filter 62 in small quantities only when needed to correct for small frequency errors.

A quad comparator 68 is used to process AFC information for the special AFC mode of operation. Microcomputer 56 receives this information from the television chassis and quad comparator 68 provides control signals for controlling the parameters of PLL 58. This information includes tuning frequency window, tuning frequency edge, the picture carrier, system timing and vertical synchronization. These input signals are processed by tuning direction, window and vertical synch comparators in quad comparator 68 and transformed into appropriate signals for driving the microcomputor 56.

When the channel is selected, the system first synthesizes the correct frequency for the channel by reading from the microcomputer's RAM 57 the appropriate digital data. Microcomputer 56 then looks at tuning edge/direction information provided by quad comparator 68 to determine the direction of tuning. Once the proper tuning direction is determined, the microcomputer 56 then steps the AFC tuning voltage in increments of 28–90 KHz, with the smaller increments used for tuning in lower channels and the larger increments used for tuning in higher channels, until the limit of the number of allowed steps for that particular channel is reached. Details of this tuning procedure are provided in Pat. No. 4,280,140 identified above.

A non-volatile MNOS memory integrated circuit 66 is coupled to microcomputer 56 for the storage of the contents of the microcomputer's RAM 57. The upper half of the microcomputer's RAM contains channel tuning information and channel blanking information stored in designated memory locations. Thus, when authorized channels are programmed for the various positions of channel group selector 20, microcomputer 56 interprets these digital inputs and records the information not only in its own memory but also in the external MNOS memory integrated circuit 66. Using the nonvolatile MNOS memory 66 as a backup memory allows power to be removed from the television receiver without the loss of stored "saved" and "skipped" channel information and channel blanking information. When power is restored to the television receiver following its removal therefrom, microcomputer 56 is programmed to detect this and to automatically read the contents of MNOS memory 66 back into its own RAM memory and then await an input command from either selector panel 18 or remote controller 24.

The light emitting diode (LED) digit circuit 38 is also controlled by the microcomputer 56. An LED driver 72 includes a latch circuit (not shown) which stores the BCD control signal information from microcomputer 56 until it is updated. Four main control lines are used for the "units" data and also the "tens" data in parallel groups. Logic in microcomputer 56 determines whether the data information is for the tens digit or units digit. A four bit binary code is provided to microcomputer 56 for decoding therein and for conversion into seven segment information for driving the LED display 38. Channel number information is continuously provided to LED display 38 via LED driver 72 from microcomputer 56. The displayed data may be changed either by operation of channel UP or DOWN programming controls 40, 42 on programming panel 16, by manipulation of channel UP or DOWN selectors 34, 36 on selector panel 18, or by operation of remote selector 30 on remote controller 24.

Microcomputer 56 constantly scans programming panel 16, channel group selector 20 and selector panel 18 by sending pulses on output scan lines thereto. In scanning these controls, microcomputer 56 looks for a user command and interrogates the position of the NORMAL/CATV switch 52 and the NORMAL/SPECIAL (AFC) switch 54. It does this by multiplexing additional signals on output scan lines. When a key position or switch is selected, the appropriate electrical contact is made resulting in the transfer of a pulse back to microcomputer 56 via an output line. The microcomputer 56 detects the pulse, producing the desired digit on the LED display 38, tuning the televison receiver to the desired channel, and storing the entry in its RAM 57 and in MNOS memory 66.

The RAM 57 of microcomputer 56 has an X-register, Y-register matrix memory organization with a capacity of 64 by four bits with each word stored in a memory storage point consisting of four bits. Each bit may be used as a flag to indicate whether a particular event has occurred or the individual bits can be used in combination in the form of a counter. For example, if the RF/CATV selector 52 is positioned in the CATV mode, a bit in RAM corresponding to the CATV memory storage location is set to 1 by the program in microcomputer 56. The output of the microcomputer's RAM would be 0100 with the 1 indicating that a flag has been set in the appropriate CATV memory storage location in RAM 57. This BCD word would then be transmitted by microcomputer 56 to phase lock loop (PLL) 58 thereby initiating the generation of new frequency and tuning information. Similarly, the selection of a particular channel number by means of channel UP or DOWN selectors 34, 36 will cause the appropriate channel tuning information storage location in the microcomputer's RAM to be addressed and the contents thereof to be read therefrom and provided to PLL 58 in initiating the indirect frequency synthesis of the selected channel. Detailed information regarding microcomputer 56 can be found in the publication "MN 1400 Series: 4-Bit 1-Chip Microcomputer" published by Matsushita Electronics Corporation. While one particular microcomputer integrated circuit is described in terms of being integrated in and operating with the present invention, it should be obvious that numerous microcomputers having the same general characteristics may be used without departing from the spirit of the present invention.

Because the organization of the RAM 57 of microcomputer 56 is unique to the present invention, it is shown in Table I and will now be described in general. Memory locations in RAM 57 are designated by M(X,Y) terminology. For example, the received channel designation would be located in the M(0,5) location (units) and the M(0,4) location (tens). Similarly, the display channel numbers would be stored in memory locations M(0,3) (units) and M(0,2) (tens). Information stored in RAM, which is a volatile memory, is lost when the receiver is turned off. When the television receiver is again turned on, the microcomputer program initializes the data in RAM from the microcomputer's ROM (not shown). Data transferred from RAM is in binary coded format.

As shown in Table I, the microcomputer's RAM is comprised of 8 rows and 16 columns of four bit words. The upper half of the RAM map, rows 4-7, contains channel number and blanking information.

TABLE I

| X/Y | | | 15 | 14 | 13 | 12 | 11 | 10 | 9 | 8 | 7 | 6 | 5 | 4 | 3 | 2 | 1 | 0 | Y/X |
|---|---|---|---|---|---|---|---|---|---|---|---|---|---|---|---|---|---|---|---|
| 7 | 1 | | M(0,1) SAVE | PWR ON TRAN 1st On-Off | MNOS WRITE ADR FLAG | MNOS WRITE FLAG Y=0 | | MNOS FLAGS | WRITE | | 36 | 35 | 34 | 33 | 32 | 31 | 30 | SW A+B 29 BLANK SW.A SW.B | 1 2 4 8 | MNOS G3 |
| 2 | | | | | | | | | | | | | | | | | | | | |
| 4 | | | | | | | | | | | | | | | | | | | | |
| 8 | | | | | | | | | | | | | | | | | | | | |
| 6 | 1 | | 28 | 27 | 26 | 25 | 24 | 23 | 22 | 21 | 20 | 19 | 18 | 17 | 16 | 15 | 14 | BLANK 13 A B | 1 2 4 8 | MNOS G2 |
| 2 | | | | | | | | | | | | | | | | | | — | | |
| 4 | | | | | | | | | | | | | | | | | | — | | |
| 8 | | | | | | | | | | | | | | | | | | — | | |
| 5 | 1 | | 12 | 11 | 10 | 9 | 8 | 7 | 6 | 5 | 4 | 3 AB BLANK A B | 2 AB BLANK A B | 83 | 79 | 75 | 71 | 67 | 1 2 4 8 | MNOS G1 |
| 2 | | | | | | | | | | | | | | 82 | 78 | 74 | 70 | 66 | | |
| 4 | | | | | | | | | | | | | | 81 | 77 | 73 | 69 | 65 | | |
| 8 | | | | | | | | | | | | | | 80 | 76 | 72 | 68 | 64 | | |
| 4 | 1 | | 60 | 56 | 52 | 48 | 44 | 40 | 36 | 32 | 28 | 24 | 20 | 16 | 12 | 8 | 4 | 2 | 1 2 4 8 | MNOS G0 |
| 2 | | | 61 | 57 | 53 | 49 | 45 | 41 | 37 | 33 | 29 | 25 | 21 | 17 | 13 | 9 | 5 | 3 | | |
| 4 | | | 62 | 58 | 54 | 50 | 46 | 42 | 38 | 34 | 30 | 26 | 22 | 18 | 14 | 10 | 6 | | | |
| 8 | | | 63 | 59 | 55 | 51 | 47 | 43 | 39 | 35 | 31 | 27 | 23 | 19 | 15 | 11 | 7 | | | |
| 3 | 1 | | | 100MS COUNTER MNOS | BOUNCE COUNTER | COUNTER DATA | | | No CHANNEL FLAG | M(0,1) SAVE | MNOS REFRESH ADDRESS (Y) | ADDRESS CALCULATION TEMPORARY | | | | X ADDRESS | Y ADDRESS | DATA ADDRESS | 1 2 4 8 | |
| 2 | 1 | | E/WFLAG | | | Sw A+B BLANK SW.A SW.B | SW.AFLAG SW.BFLAG | SKIP BLANK | MEM Sw A+B BLANK SW.A SW.B | RECALL FLAG | | | | | | | | 60Hz STATE POW OFF POW OFF FLAG | 1 2 4 8 | |
| 1 | 1 | | AFC TIMING COUNT | | | Q5 TIMER (KEY OPERATION) TIMER | .33 SEC TIMER | PLL LOWER LIMIT | PLL UPPER LIMIT | PLL RC LATCH 1 | PLL RC LATCH 0 | PLL SC LATCH 4 | PLL SC LATCH 3 | PLL SC LATCH 2 | TIMER 3 -SECOND- | DISPLAY TIMER | TIMER 2 (328 MS) | TIMER 1 (82 MS) | 1 2 4 8 | |
| 2 | | | | | | | | | | | | | | | 60 COUNT | | | | | |

TABLE I-continued

| 0 1 2 4 8 | V SVN DET FLAG | C ECT COUNTER | AFCOX FLAG | NOT AFC FLAG COUNTER | MFT TIMER COUNT | UPPER KEY FLAG | KEY BOUNCE | KEY INPUT DATA | A.CH UP A.CH DN FLAGS | S.MUTE BLANK CH UP/DN | RECEI CHAN 1s | VING NEL 10s | DISP CHAN 1s | LAY NEL 10s | HI VHF MID SUPER UHF | AFC CATV AFCIV | 1 0 2 4 8 |
|---|---|---|---|---|---|---|---|---|---|---|---|---|---|---|---|---|---|
| X/Y | 15 | 14 | 13 | 12 | 11 | 10 | 9 | 8 | 7 | 6 | 5 | 4 | 3 | 2 | 1 | 0 | Y\X |

Each bit in the upper portion of the RAM map, with the exception of a portion of row 7 which includes MNOS recall and power ON/OFF information, represents a particular channel or the raster blanking of a particular channel. In the programming procedure, following the selection of a channel by means of either channel UP or DOWN programming controls 40, 42, the selection of channel access/skip control 44 causes a 1 to be written in the appropriate RAM location corresponding to the channel number selected. This designates that channel to be "saved", or tuned to, when selected by means of selector panel 18. Similarly, the non-selection of channel access/skip control 44 will cause a 0 to be written into the appropriate RAM memory location resulting in the corresponding channel being "skipped" during the channel selection process.

As shown in FIG. 1, channel group selector 20 has four different positions. Position 1 simply applies line voltage to the television receiver 12. Positions 2, 3 and 4 are active only when RF/CATV selector 52 is in the CATV mode of operation. Thus, positions 2, 3 and 4 of key-actuated channel group selector 20 are for the selective programming of various groups of VHF/CATV channels.

In the uppermost portion of the microcomputer's RAM 57 are stored VHF/CATV channel tuning and blanking information in binary code as indicated in rows 5, 6 and 7 in Table I. Programming data for VHF channels 2 through 13 and CATV channels 14 through 36 (letter channels A through W) are stored sequentially at locations M(5,5) through M(7,7). The binary code is provided to microcomputer 56 by means of channel group selector 20 which includes binary switches A and B. Table II presents the keyswitch logic of binary switches A and B in terms of the various positions of channel group selector 20.

TABLE II

| KEYSWITCH POSITION | A | B |
|---|---|---|
| 1 (off position) | Open | Open |
| 2 | Open | Closed |
| 3 | Closed | Open |
| 4 | Closed | Closed |

These binary codes are shown in Table I for VHF/CATV channels 2 through 36 where the first bit in each memory location represents keyswitch position 4, the second bit represents blanked video, the third bit represents keyswitch position 2 and the fourth bit represents keyswitch position 3. Positions 2, 3 and 4 may only be activated when RF/CATV selector 52 is in the CATV position. With RF/CATV selector 52 in the CATV position, tuning information related to selective VHF/CATV channels may be entered into the RAM memory locations with each stored channel included in a particular VHF/CATV channel group in accordance with the position of channel group selector 20 when the tuning information relative to that channel is entered. Thus, each four bit location in the VHF/CATV channel storage portion of RAM 57 may contain tuning information with respect to three different VHF/CATV channel groups and also blanking information with respect thereto. Thus, a particular VHF/CATV channel is selected by placing channel group selector 20 in one of the three channel selecting positions and entering the desired channel number by means of selector panel 18. From the RAM map of Table I, it can be seen that the second bit in each VHF/CATV channel storage location contains channel blanking information. With RF/CATV selector 52 in the RF position, channel programming and selection is independent of channel group selector 20. VHF/UHF programming data is stored sequentially at locations M(4,0) through M(5,4).

As previously stated, microcomputer 56 outputs scanning signals to programming panel 16, selector panel 18 and channel group selector 20. The general tuning program stored in microcomputer 56, which does not form a part of the present invention, allows for the periodic updating of digital display 38, channel status indicator 48 and channel blank/NORMAL indicator 50. During this process microcomputer 56 provides a small current signal to channel status indicator 48 and channel blank/NORMAL indicator 50 via transistors 80 and 78, respectively. This small current output is amplified by these transistors such that when transistor 82 is turned on by another output from microcomputer 56, status and blank/NORMAL LED indicators 48, 50 are illuminated depending on the contents of the appropriate RAM memory location in microcomputer 56. The turn-on output for transistor 82 is provided by microcomputer 56 in accordance with the timing of the general tuning program stored in microcomputer 56 and occurs periodically during each tuning cycle of that program. Resistors 84, 86 and 88 provide biasing for transistor turnon, while resistors 90 and 92 provide proper diode biasing. Programming panel 16 also provides for the sequential scanning of channel UP and DOWN programming controls 40, 42 and channel access/skip and blank/NORMAL controls 44, 46. Programming panel 16 is also coupled to selector panel 18 to provide microcomputer status monitoring of channel UP and DOWN selectors 34, 36. Finally, programming panel 16 is coupled to remote controller 24 in providing microcomputer status scanning of remote selector 30 on remote controller 24.

Control chassis 94 acts as an interface between the combination of programming panel 16 and selector panel 18 and remote controller 24. Conductors A, B and C connect remote controller 24 to control chassis 94, with line A carrying channel UP information and line C carrying audio volume control information from remote controller 24 to microcomputer 56 via programming panel 16. Line B serves as a common ground between remote controller 24 and control chassis 94. The channel UP signal provided by remote controller 24 to control chassis 94 is filtered by means of resistor 96 and capacitor 98 and amplified by coupled transistors 100, 102. Resistors 104, 106 and 108 and capacitor 110 provide proper transistor biasing with the channel UP signal provided on line D to programming panel 16.

An AC line input is provided to the primary winding 113 of transformer 112 with a step down voltage provided by the secondary 115 of transformer 112 to microcomputer 56 via line F. The line F AC output is filtered and rectified in a conventional manner prior to providing power to microcomputer 56. The AC line source is also coupled via line G and relay 116 to a television receiver power supply (not shown) upon the actuation of channel group selector 20. The signal from channel group selector 20 engaging relay 116 for providing the AC line source to the television receiver power supply is carried on line E to transistors 118, 120 which serve as a power on/power off switch. Resistor 124 limits the current to transistor 120 while capacitor 122 provides input signal filtering. Resistors 126, 128 and 130 provide proper biasing for transistors 118, 120 while diode 132 provides arc suppression for relay 116.

The operation of microcomputer 56 in controlling the overall operation of the selective video reception control system 10 will now be explained in general terms with reference to FIG. 3 and Table III. Table III is a computer program listing for selective channel tuning, MNOS memory storage and recall, video blanking, selector scanning and system timing. Contained in this program assembly listing is such information as memory addresses, object code, statement number and additional source statement information. Detailed information regarding the symbology used in Table III is contained in the publication "MN 1400 Series: 4-Bit 1-Chip Microcomputer", published by Matsushita Electronics Corporation.

Figure 3:
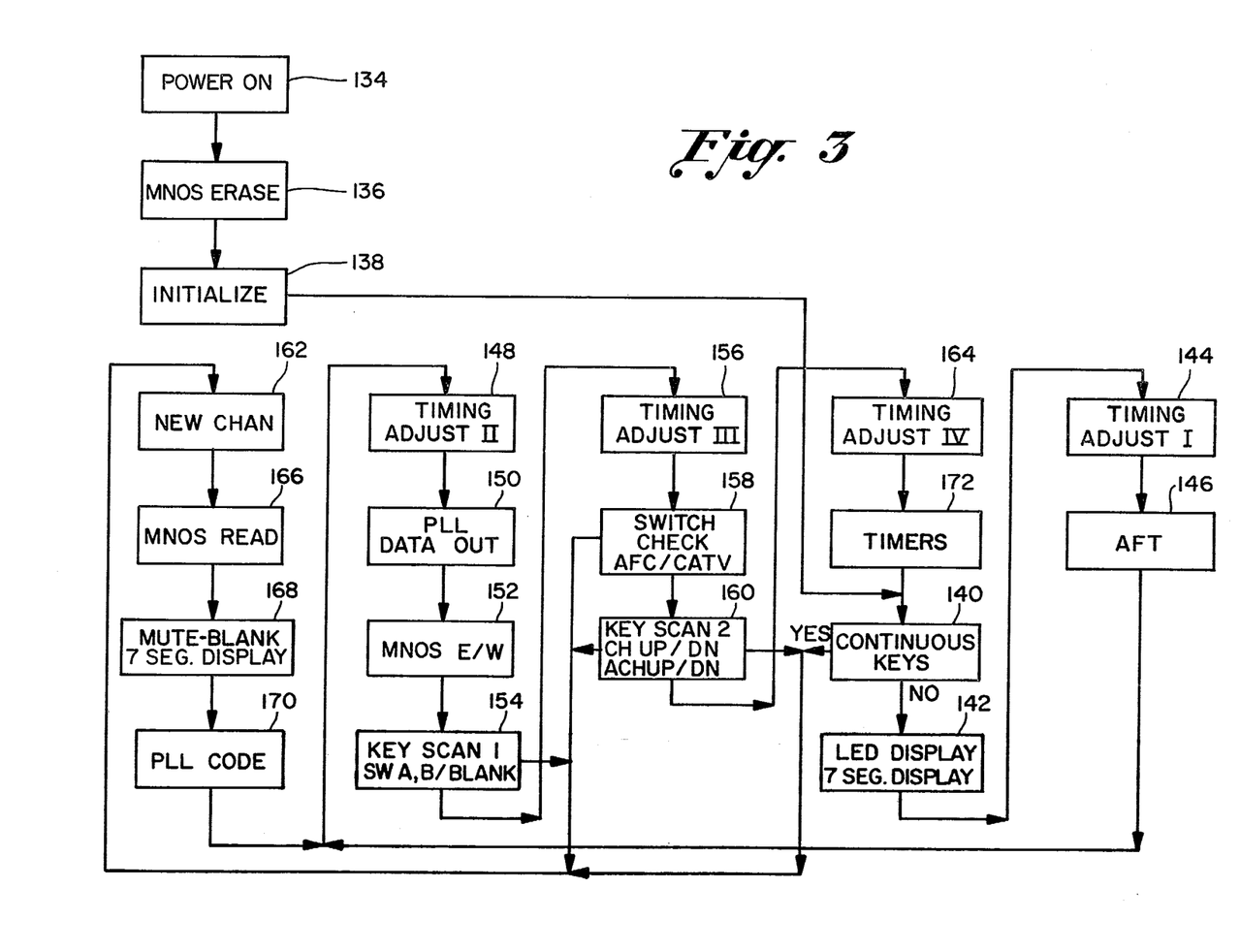
FIG. 3 is a flowchart illustrating the operation of the selective video reception control system under the control of the microcomputer.

Referring to FIG. 3, the program stored in microcomputer 56 includes instructional sequences for controlling various subsystems and operations in the television receiver. One of these operations includes the selective viewing capability of "stored" channels by tuning the television receiver thereto. This operation is implemented by microcomputer 56 as shown in FIG. 3. The POWER ON step 134 corresponds to operator turn-on of the television receiver 12 by means of channel group selector key switch 20. An MNOS ERASE step 136 permits the clearing of information stored in MNOS memory 66. This procedure is typically performed in the factory during the manufacturing process.

Next, the program proceeds to an INITIALIZE step 138 for clearing RAM 57, initiating microcomputer timing, etc. The program then proceeds to CONTINUOUS KEYS 140 where it scans all the selector keys to detect the continuous engagement of a selector key. If no key is continuously engaged, the program then proceeds to LED DISPLAY 142 for energizing and providing the appropriate signals to LED DISPLAY 38. The program then synchronizes itself with a 200 Hz system clock in a TIMING ADJUST I sequence 144 for proper system syncronization. An AFT routine 146 is then entered in which, if the television receiver is off, the program merely idles through and proceeds to a TIMING ADJUST II sequence 148. PLL tuning information is then updated from memory in the PLL DATA OUT step 150 before the system proceeds to an MNOS E/W (Erase/Write) step 152. Since the television receiver is off, the system idles through step 152 and proceeds to KEY SCAN 1 step 154 where it monitors the status of the channel group selector 20, channel access/skip control 44 and blank/normal control 46. If the television receiver is off, no operation is performed here and the program proceeds to the next TIMING ADJUST III step 156 followed by a SWITCH CHECK procedure 158 wherein the status of the RF/CATV selector 52 is monitored. Since the television receiver is off, the program proceeds to KEY SCAN 2 step 160 where it again senses the engagement of any of the selectable controls in the system. If the television receiver is on or any new entry has been made, the program proceeds to NEW CHANNEL step 162. If the television receiver is still off, the program idles to yet another TIMING ADJUST IV step 164 where system timing is synchronized with the 200 Hz system clock.

The turning on of the television receiver 12 is detected by the KEY SCAN 2 step 160 by the selection of either the channel UP or channel DOWN selector 34,36. Once the system detects the turning on of the television receiver, it proceeds to the NEW CHANNEL step 162. Following initial television receiver turn-on, the program proceeds to MNOS READ step 166 where appropriate programming and PLL information is read from MNOS memory 66. Otherwise, the program bypasses MNOS READ step 166. In step 168 the program mutes the audio and blanks the video of the television receiver while updating the LED display 38 following a channel selection change. At step 170 the program generates PLL tuning information in hexadecimal code prior to providing it to PLL 58 in tuning system 65. This coded information is provided to the counters and dividers in PLL 58 for proper channel frequency synthesis.

There has thus been described a selective video reception control system for programming a television receiver for receiving only selected groups of channels. The system also provides the capability of selectively programming the reception of only designated programs within the selected channel groups by means of a microcomputer. Thus, separate groups of VHF, UHF or CATV channels are programmable by means of a key switch having various positions of engagement corresponding to individual groups of channels. Following key switch selection of a given group of channels, any number of channels within that group may be programmed for viewing by means of channel UP and DOWN programming keys. While the present invention has been described as providing for the key switch selection of three separate groups of CATV channels and the use of an RF/CATV selector, it is not limited to this frequency band organization. Indeed, by appropriately programming memory locations in the microcomputer's RAM virtually any combination of channels may be arranged for the selective reception of designated channel groups and specific channels therein by means of the key switch and microcomputer operation of the present invention.

While particular embodiments of the present invention have been shown and described, it will be apparent to those skilled in the art that changes and modifications may be made therein without departing from the invention in its broader aspects. The aim in the appended claims, therefore, is to cover all such changes and modifications as fall within the true spirit and scope of the invention.

We claim:

1. In a microcomputer controlled indirect frequency synthesis tuning system for tuning a television receiver to a desired channel in a designated one of a plurality of frequency bands, a programmable system for selectively limiting the channels and frequency bands to which said television receiver may be tuned comprising:

first memory means in said microcomputer for storing channel tuning and frequency band switching information;

first control means coupled to an electrical line source for applying said line source to said television receiver when engaged and coupled to said microcomputer for reading frequency band switching information representing a plurality of designated groups of channels from said first memory means and for providing said frequency band switching information to said tuning system;

second control means coupled to said microcomputer for selectively storing in said first memory means channel access information for tuning to a selected channel or channel skip information for inhibiting tuning to a selected channel; and third control means coupled to said microcomputer for reading from said first memory means in an increasing or decreasing channel number sequence channel access or skip information and channel tuning information and for respectively providing or not providing said channel tuning information to said tuning system in limiting the tuning of said television receiver only to selected channels in each of said plurality of frequency bands.

2. The system of claim 1 wherein raster blanking information is stored in said first memory means by said second control means for the video blanking of said television receiver in tuning to a television channel wherein only an audio signal is received.

3. A system according to claim 1 wherein said television receiver is turned off by the actuation of said third control means in selecting a channel number greater than the highest channel number for which channel access information is stored in said first memory means.

4. A system according to claim 3 wherein said television receiver is turned on by the actuation of said third control means in selecting a higher channel number when said television receiver is off.

5. The system of claim 1 further comprising a hard-wired remote control unit including speaker means, volume control means and fourth control means for reading from said first memory means in an increasing channel number sequence channel access or skip information and channel tuning information and for respectively providing or not providing said channel tuning information to said tuning system in selectively limiting the tuning of said television receiver only to designated channels in each of said plurality of frequency bands.

6. The system according to claim 5 wherein said television receiver is turned off by the actuation of said fourth control means so as to select a channel number greater than the highest channel number for which channel access information is stored in said first memory means.

7. A system according to claim 6 wherein said television receiver is turned on by the actuation of said fourth control means in selecting a higher channel number when said television receiver is off.

8. The system of claim 2 further comprising first, second and third display means coupled to said microcomputer for receiving from said first memory means and displaying channel access or skip information, video blanking information and selected channel number, respectively.

9. The system of claim 1 further comprising fifth control means for selecting either VHF/UHF frequency bands or the CATV frequency band wherein any one of a plurality of groups of CATV channels may be selected by said first control means.

10. The system of claim 1 further comprising nonvolatile memory means coupled to said first memory means for storing said channel access and skip information, said frequency band switching information and said tuning information and for providing said information to said first memory means for storage therein if said line source is removed from said television receiver.

11. In a microcomputer controlled indirect frequency synthesis tuning system for tuning a television receiver to a desired channel in a designated one of a plurality of frequency bands, said tuning system including means for selecting either VHF/UHF frequency bands or the CATV frequency band, a programmable system for selectively limiting the channels and frequency bands to which said television receiver may be tuned comprising:

first memory means in said microcomputer for storing channel tuning and frequency band switching information;

first control means coupled to an electrical line source for applying said line source to said television receiver when engaged and coupled to said microcomputer for reading frequency band switching information representing a plurality of designated groups of CATV channels from said first memory means and for providing said frequency band switching information to said tuning system when the CATV frequency band is selected by said frequency band selection means;

second control means coupled to said microcomputer for selectively storing in said first memory means channel access information for tuning to a selected channel or channel skip information for inhibiting tuning to a selected channel; and third control means coupled to said microcomputer for reading from said first memory means in an increasing or decreasing channel number sequence channel access or skip information and channel tuning information and for respectively providing or not providing said channel tuning information to said tuning system in limiting the tuning of said television receiver only to selected CATV channels in each of said pluralities of designated groups of CATV channels.

12. In a microcomputer controlled indirect frequency synthesis tuning system for tuning a television receiver having a video display to a desired channel in a designated one of a plurality of frequency bands, said tuning system including means for selecting either VHF/UHF frequency bands or the CATV frequency band, a programmable system for selectively limiting the channels and frequency bands to which said television receiver may be tuned and for selectively blanking the video display of said television receiver, said system comprising:

first memory means in said microcomputer for storing channel tuning and frequency band switching information;

first control means coupled to an electrical line source for applying said line source to said television receiver when engaged and coupled to said microcomputer for reading frequency band switching information representing a plurality of designated groups of CATV channels from said first memory means and for providing said frequency band switching information to said tuning system when the CATV frequency band is selected by said frequency band selection means;

second control means coupled to said microcomputer for selectively storing in said first memory means:
channel access information for tuning to a selected channel or channel skip information for inhibiting tuning to a selected channel; and
raster blanking information for the selective video blanking of the television receiver's video display; and third control means coupled to said microcomputer for reading from said first memory means in an increasing or decreasing channel number sequence channel access or skip information and channel tuning information and for respectively providing or not providing said channel tuning information to said tuning system in limiting the tuning of said television receiver only to selected CATV channels in each of said pluralities of designated groups of CATV channels and for reading from said first memory means and providing to said video display raster blanking information for the selective blanking of said television receiver.

13. In a microcomputer controlled indirect frequency synthesis tuning system for tuning a television receiver to a desired channel in a designated one of a plurality of frequency bands, a programmable system for selectively limiting the channels and frequency bands to which said television receiver may be tuned comprising:
first memory means in said microcomputer for storing channel tuning and frequency band switching information;
first control means coupled to an electrical line source for applying said line source to said television receiver when engaged and coupled to said microcomputer for reading frequency band switching information representing a designated group of channels from said first memory means and for providing said frequency band switching information to said tuning system;
second control means coupled to said microcomputer for selectively storing in said first memory means channel access information for tuning to a selected channel or channel skip information for inhibiting tuning to a selected channel; and
channel selection means coupled to said microcomputer for:
reading from said first memory means in an increasing or decreasing channel number sequence channel access or skip information and channel tuning information and for respectively providing or not providing said channel tuning information to said tuning system in limiting the tuning of said television receiver only to selected channels in each of said plurality of frequency bands;
turning off said television receiver by selecting a channel number greater than the highest channel number for which channel access information is stored in said first memory means; and
turning on said television receiver by selecting a higher channel number when said television receiver is off.

14. In a microcomputer controlled indirect frequency synthesis tuning system for tuning a television receiver to a desired channel in a designated one of a plurality of frequency bands, a programmable system for selectively limiting the channels and frequency bands to which said television receiver may be tuned comprising:
first memory means in said microcomputer for storing channel tuning and frequency band switching information;
first control means coupled to an electrical line source for applying said line source to said television receiver when engaged and coupled to said microcomputer for reading frequency band switching information representing a designated group of channels from said first memory means and for providing said frequency band switching information to said tuning system;
second control means coupled to said microcomputer for selectively storing in said first memory means channel access information for tuning to a selected channel or channel skip information for inhibiting tuning to a selected channel;
third control means coupled to said microcomputer for reading from said first memory means in an increasing or decreasing channel number sequence channel access or skip information and channel tuning information and for respectively providing or not providing said channel tuning information to said tuning system in limiting the tuning of said television receiver only to selected channels in each of said plurality of frequency bands; and
hard-wired remote control means including speaker means, volume control means and fourth control means for reading from said first memory means in an increasing channel number sequence channel access or skip information and channel tuning information and for respectively providing or not providing said channel tuning information to said tuning system in selectively limiting the tuning of said television receiver only to designated channels in each of said plurality of frequency bands wherein said television receiver is turned on by the actuation of said third or fourth control means in selecting a higher or lower channel and said television receiver is turned off by the actuation of said third or fourth control means in selecting a channel number greater than the highest or less than the lowest channel number for which channel access information is stored in said first memory means.

15. In a microcomputer controlled indirect frequency synthesis tuning system for tuning a television receiver having a video display to a desired channel in a designated one of a plurality of frequency bands, said tuning system including means for selecting either VHF/UHF frequency bands or the CATV frequency band, a programmable system for selectively limiting the channels and frequency bands to which said television receiver may be tuned and for selectively blanking the television receiver's video display, said system comprising:
first memory means in said microcomputer for storing channel tuning and frequency band switching information;
first control means coupled to an electrical line source for applying said line source to said television receiver when engaged and coupled to said microcomputer for reading frequency band switching information representing a plurality of designated groups of CATV channels from said first memory means and for providing said frequency band switching information to said tuning system when the CATV frequency band is selected by said frequency band selection means;
second control means coupled to said microcomputer for selectively storing in said first memory means:
channel access information for tuning to a selected channel or channel skip information for inhibiting tuning to a selected channel; and
raster blanking information for the selective video blanking of said television receiver's video display; and
non-volatile memory means coupled to said first memory means for storing said channel access and skip information, said frequency band switching information and said tuning information and for providing said information to said first memory means for storage therein if said line source is removed from said television receiver;

first, second and third display means coupled to said microcomputer for receiving from said first memory means and displaying channel access or skip information, video blanking information and selected channel number, respectively; and third control means coupled to said microcomputer for reading from said first memory means in an increasing or decreasing channel number sequence channel access or skip information and channel tuning information and for respectively providing or not providing said channel tuning information to said tuning system in limiting the tuning of said television receiver only to selected CATV channels in each of said pluralities of designated groups of CATV channels and for reading from said first memory means and providing to said video display raster blanking information for the selective blanking of said television receiver.

* * * * *